United States Patent [19]

Kraus

[11] Patent Number: 4,652,474

[45] Date of Patent: Mar. 24, 1987

[54] TUBULAR ARTICLE OF POLYMERIC MATERIAL

[75] Inventor: Gerhard Kraus, Aurachtal, Fed. Rep. of Germany

[73] Assignee: INA Walzlager Schaeffler KG, Fed. Rep. of Germany

[21] Appl. No.: 803,717

[22] Filed: Dec. 2, 1985

[30] Foreign Application Priority Data

Dec. 15, 1984 [DE] Fed. Rep. of Germany ....... 3445892

[51] Int. Cl.[4] .................. B32B 3/02; B32B 27/00; B32B 15/08; F16H 55/48
[52] U.S. Cl. .................................. 428/36; 428/65; 428/425.8; 428/460; 474/190
[58] Field of Search ................. 474/190, 195; 428/36, 428/425.8, 460

[56] References Cited

U.S. PATENT DOCUMENTS

| | | | |
|---|---|---|---|
| 3,772,928 | 11/1973 | Gobeille | 74/230.7 |
| 3,788,155 | 1/1974 | Cigala et al. | 74/230.01 |
| 4,469,357 | 9/1984 | Martin | 285/381 |
| 4,473,363 | 9/1984 | McCutchan, Jr. | 474/161 |
| 4,482,340 | 11/1984 | Kovaleski | 474/180 |
| 4,548,592 | 10/1985 | Ohhashi et al. | 474/168 |

*Primary Examiner*—John E. Kittle
*Assistant Examiner*—Patrick J. Ryan
*Attorney, Agent, or Firm*—Bierman & Muserlian

[57] ABSTRACT

A tubular article of polymeric material which has two coaxial tubular sections extending in opposite axial directions and an intermediate section integral with the tubular sections. One of the tubular sections snugly surrounds a metallic sleeve which is positively fitted in the one tubular section and has a keyway for the external key of a drive shaft, and the one tubular section has axially parallel external ribs which reinforce its resistance to deformation and potential separation of its internal surface from the sleeve. If the outer diameter of the one tubular section matches or approximates that of the other tubular section, the intermediate section and the one tubular section are provided with external ring-shaped collars which are integral with and reinforce the ribs. If the other diameter of the other tubular section exceeds the other diameter of the one tubular section, the article has a cylinder which spacedly surrounds the one tubular section, which is integral with the radially outermost part of the intermediate section, and which is integral with the radially outermost portions of the ribs. The one tubular section can constitute a hub which receives torque from or transmits torque to a shaft, and the other tubular section then constitutes a pulley for one or more V-belts.

11 Claims, 4 Drawing Figures

TUBULAR ARTICLE OF POLYMERIC MATERIAL

BACKGROUND OF THE INVENTION

The present invention relates to improvements in pulleys and like articles which are or can be made of a polymeric material, especially to improvements in articles which are manufactured in casting, extruding and like machines. More particularly, the invention relates to improvements in articles of the type having two coaxial tubular sections and a ring-shaped intermediate section which is integral with the tubular sections. If an article of the just outlined character is used in a belt transmission or the like, one of the tubular sections acts as a pulley for one or more endless belts, and the other tubular section is non-rotatably mounted on a shaft or the like in order to transmit torque from the shaft to the belt or belts, or vice versa. It is customary to embed in the other tubular section a metallic sleeve which can be non-rotatably slipped onto the shaft so as to prevent any angular movements of the shaft and the other tubular section relative to each other.

A drawback of presently known articles of the above outlined character is that the bond between the metallic sleeve and the corresponding tubular section is unreliable, primarily due to the development of bending, stresses, especially rotating bending stresses, which tend to separate the external surface of the sleeve from the internal surface of the corresponding tubular section. The termination of a reliable bond between the sleeve and the corresponding tubular section of the article is attributable mainly, or to a large extent, to the development of bending stresses when the one tubular section is engaged by one or more endless V-belts or the like and the other tubular section is non-rotatably held on the shaft. It has been found that the sleeves become loose after a relatively short interval of use of such conventional articles so that the articles must be discarded in their entirety.

Attempts to prevent rapid separation of the sleeve include the provision of highly complex articles which are configurated and dimensioned with a view to reduce the likelihood of rapid or immediate termination of the bond between the sleeve and the adjacent tubular section. A drawback of such proposals is that the cost of the articles is unduly increased without guaranteeing the establishment and maintenance of a reliable and long-lasting bond between the metallic sleeve and the adjacent plastic material.

OBJECTS AND SUMMARY OF THE INVENTION

An object of the invention is to provide a novel and improved article of manufacture wherein a normally metallic sleeve is embedded in a tubular section of polymeric material and wherein the bond between such tubular section and the sleeve is much more reliable and longer-lasting than in heretofore known articles.

Another object of the invention is to provide a relatively simple and inexpensive article wherein the sleeve which is embedded in a tubular section of polymeric material remains embedded in the tubular section even if the section and/or other parts of the plastic part of the article are subjected to pronounced bending stresses, especially rotating bending stresses, in a number of different directions.

A further object of the invention is to provide an article of the above outlined character which can be utilized with advantage as a means for transmitting torque between a driven or driver shaft and one or more endless belts.

An additional object of the invention is to provide novel and improved means for reinforcing selected portions of a tubular article of polymeric material which is subjected to pronounced bending stresses.

A further object of the invention is to provide an article which exhibits the above outlined advantages and can be mass produced in existing casting, extruding and/or like plastic-shaping machines.

Still another object of the invention is to provide a novel and improved method of preventing or reducing the likelihood of termination of a bond between the internal surface of a tubular part of polymeric material and the external surface of a metallic part in the tubular part.

The invention is embodied in an article of manufacture, particularly in a cast or extruded article of polymeric material. The article comprises two coaxial tubular sections which extend in opposite axial directions, an annular intermediate section which is disposed between the tubular sections, and a metallic sleeve which is positively fitted into one of the tubular sections and whose axial length may but need not equal the axial length of the one tubular section. The one tubular section has a plurality of reinforcing ribs which extend from its external surface at least substantially in the direction of the common axis of the tubular sections. The length of the ribs, as considered in the direction of the common axis of the tubular sections, can equal or exceed the length of the sleeve.

The one tubular section is preferably formed with at least three equidistant ribs (in accordance with a presently preferred embodiment, the one tubular section has at least ten equidistant ribs) which are disposed in planes including the common axis of the tubular sections.

The diameters of the external surfaces of the other tubular section and intermediate section can equal or at least approximate the diameter of the external surface of the one tubular section. The intermediate section can be provided with a ring-shaped collar which extends radially outwardly beyond its external surface, and at least some of the reinforcing ribs are integral with such collar and extend all the way to that end of the external surface of the one tubular section which is remote from the intermediate section.

Alternatively, the diameter of the external surface of the other tubular section exceeds the diameter of the external surface of the one tubular section and the intermediate section then extends radially inwardly from the inner end portion of the other tubular section to the inner end portion of the one tubular section. At least some reinforcing ribs of the just described article preferably extend from one side of the intermediate section toward and preferably all the way to that end portion of the one tubular section which is remote from the intermediate section.

That end portion of the one tubular section which is remote from the intermediate section can be provided with a ring-shaped collar which extends radially outwardly beyond its external surface and is integral with at least some of the reinforcing ribs. Such article can have one or more additional ring-shaped collars which extend substantially radially outwardly beyond the external surface of the one tubular section between the first mentioned collar and the intermediate section. At least some of the ribs are integral with the additional collar or collars and extend axially of the one tubular section beyond both sides of the additional collar or collars.

The article can comprise a tubular component (e.g., a cylinder) which is integral with the intermediate section and surrounds the ribs of the one tubular section. The tubular component is preferably coaxial with the one tubular section and is preferably integral with the radially outermost portions of the reinforcing ribs. The length of the tubular component can equal or approximate the length of the one tubular section, as considered in the axial direction of the sections.

The other tubular section of the improved article can constitute a pulley and the one tubular section can constitute a hub whose sleeve can be non-rotatably slipped onto a torque transmitting element in the form of a shaft or the like.

The novel features which are considered as characteristic of the invention are set forth in particular in the appended claims. The improved article itself, however, both as to its construction and the mode of making the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
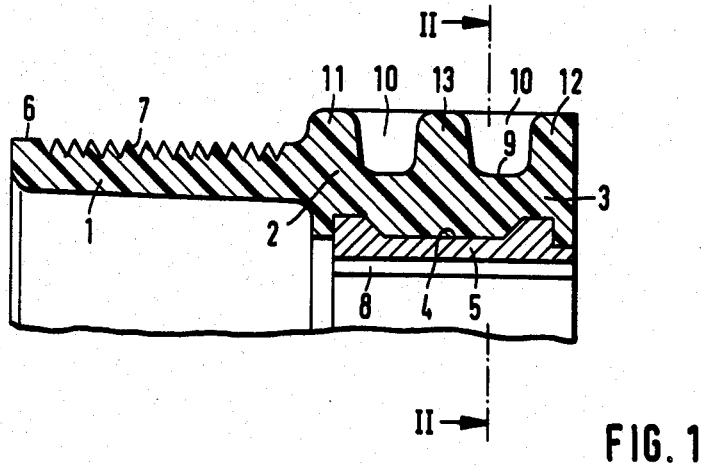
FIG. 1 is a fragmentary axial sectional view of an article which embodies one form of the invention and wherein the outer diameters of the two tubular sections match or approximate the outer diameter of the intermediate section.
Figure 2:
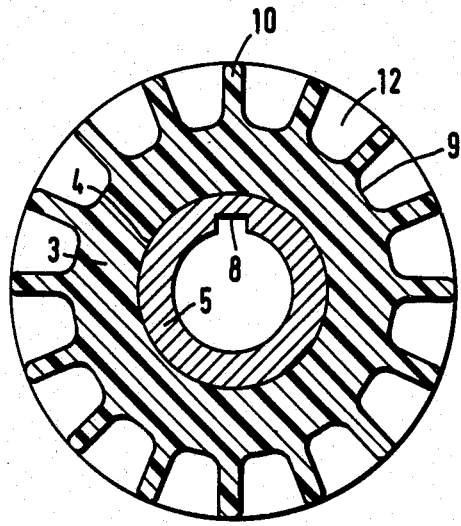
FIG. 2 is a transverse sectional view as seen in the direction of arrows from the line II—II of FIG. 1.

FIGS. 1 and 2 show an article which is made in a casting or extruding machine from a polymeric material and can be used to transmit torque to, or to receive torque from, a poly-V belt or the like (not shown). The article comprises a first tubular section 1 having an external surface 6 with circumferentially complete grooves 7 for a portion of the poly-V belt, an annular intermediate section 2 which is integral with one (inner) end portion of the tubular section 1, and a second tubular section 3 which is integral with the intermediate section 2. The tubular sections 1 and 3 extend in opposite axial directions. The section 1 constitutes the pulley and the section 3 constitutes that constituent (hub) of the article which receives torque from a drive shaft (not shown) and transmits torque to the section 1 through the medium of the section 2, or vice versa. The internal surface 4 surrounding an axial passage of the section 3 snugly receives a positively fitted metallic sleeve 5 having an axially parallel keyway 8 (see particularly FIG. 2) for the axially parallel key of the aforementioned shaft, i.e., the sleeve 5 and the shaft cannot and should not rotate relative to each other.

The diameter of the external surface 6 of the tubular section 1 approximates the diameter of the external surface 9 of the tubular section 3 as well as the diameter of the external surface of the intermediate section 2. In accordance with a feature of the invention, the tubular section 3 is formed with sixteen equidistant reinforcing ribs 10 which extend in parallel with the common axis of the sections 1 to 3 and in planes that include such axis. Each rib 10 extends from a ring-shaped collar 11 which extends substantially radially outwardly beyond the external surface of the intermediate section 2 to a similar ring-shaped collar 12 which extends substantially radially outwardly beyond the external surface 9 from that end portion of the tubular section 3 which is remote from the intermediate section 2. The tubular section 3 can be provided with one or more additional ring-shaped collars which extend substantially radially from the surface 9 intermediate the collars 11 and 12. FIG. 1 merely shows a single additional collar 13 which is disposed substantially or exactly midway between the collars 11 and 12. Each reinforcing rib 10 extends axially beyond both sides of the intermediate collar 13, i.e., from that side which faces the collar 11 as well as from that side which faces the collar 12. The ribs 10 are integral with the tubular section 3 as well as with each of the collars 11 to 13.

The purpose of the ribs 10 is to reinforce the tubular section 3 so that the latter is highly unlikely to become separated from the sleeve 5 even if the intermediate section 2 is called upon to transmit pronounced torque from the section 1 to the section 3 or vice versa and if one or more of the sections are subjected to bending stresses, especially rotating bending stresses. The ribs 10 reinforce the section 3 and the entire article in the axial as well as in the circumferential direction and greatly reduce the likelihood of loosening of the sleeve 5. The placing of ribs 10 into planes which include the common axis of the sections 1 to 3 further enhances the stability of the article and ensures that the resistance of the article to deforming stresses is the same or practically the same in a number of different directions, i.e., the article can stand pronounced bending stresses about a plurality of different axes.

Figure 3:
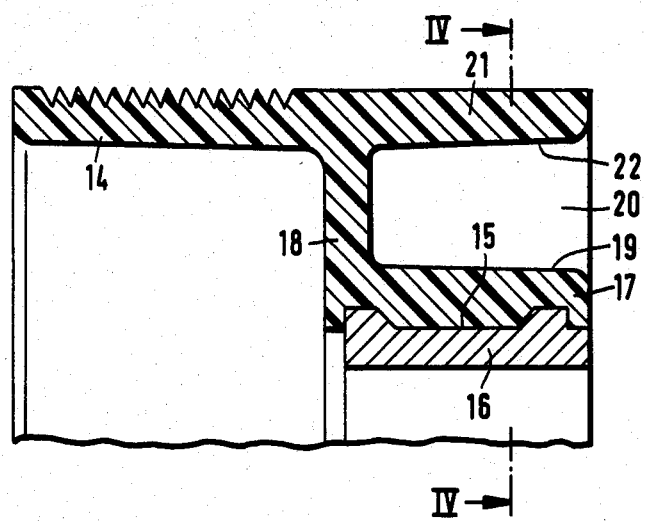
FIG. 3 is a fragmentary axial sectional view of a second article wherein the outer diameter of the one tubular section is less than the outer diameter of the other tubular section and the radially outermost portions of the reinforcing ribs are integral with a tubular component which spacedly surrounds the one tubular section and is integral with the radially outermost portion of the intermediate section.
Figure 4:
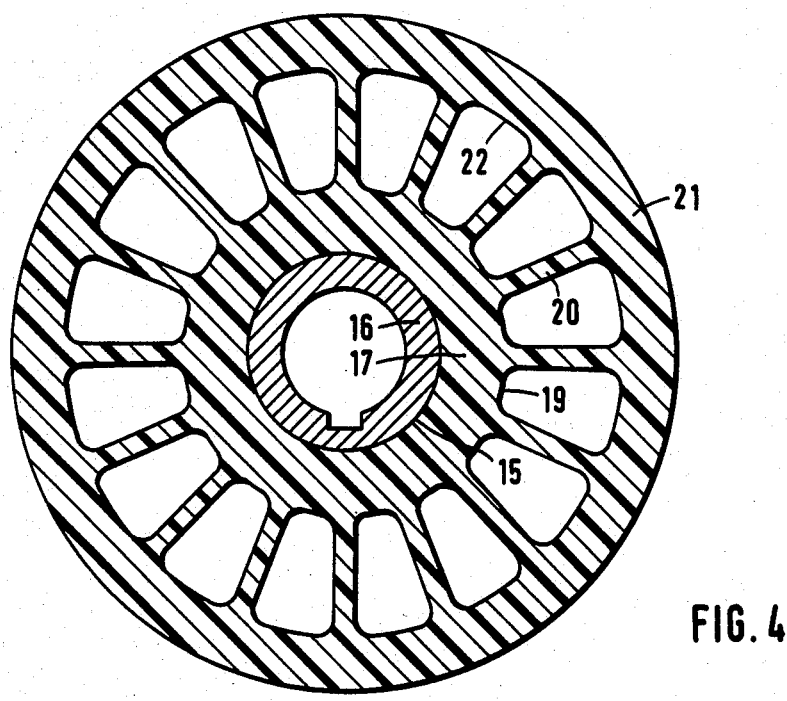
FIG. 4 is a transverse sectional view as seen in the direction of arrows from the line IV—IV of FIG. 3.

FIGS. 3 and 4 show a modified tubular article whose material is or can be the same as that of the article which is shown in FIGS. 1 and 2. The inner and outer diameters of the first tubular section 14 exceed the corresponding diameters of the second tubular section 17, the tubular sections 14 and 17 extend in opposite axial directions, and the intermediate section 18 resembles a washer which extends from the adjacent inner end portion of the tubular section 14 radially inwardly toward the adjacent inner end portion of the tubular section 17. The metallic sleeve 16 is surrounded by and fits positively into the internal surface 15 of the tubular section 17. The external surface 19 of the section 17 is surrounded by a set of sixteen axially parallel equidistant reinforcing ribs 20 each of which is integral with the intermediate section 18 and extends all the way to the right-hand end portion of the tubular section 17, as viewed in FIG. 3. The article of FIGS. 3 and 4 further comprises a tubular component 21 in the form of a cylinder whose axial length matches the axial length of the tubular section 17, which spacedly surrounds and is coaxial with the section 17, which is integral with the radially outermost part of the intermediate section 18, and which is integral with the radially outermost portions of the reinforcing ribs 20 (as at 22). The external surface of the tubular section 14 (which can constitute a pulley) is configured in the same way as the external surface 6 of the section 1 shown in FIG. 1.

The ribs 20 reinforce or stiffen the section 17 so that the latter is highly unlikely to become separated from the sleeve 17 under circumstances which prevail in machines or apparatus wherein the improved article is put to use. The tubular component 21 also contributes to rigidity of the tubular section 17 and of the entire article. The article of FIGS. 3 and 4 exhibits the additional advantage that its ribs 20 can be readily removed from a form or mold in a direction to the left, as viewed in FIG. 3.

An important advantage of the improved article is that the sleeve remains permanently embedded in the corresponding tubular section and that such permanent embedding is ensured in a surprisingly inexpensive, simple and efficient manner, i.e., by the simple expedient of reinforcing the corresponding tubular section with ribs which are integral therewith and at least some of which extend axially of the article from the intermediate section all the way to that end portion of the tubular section 3 or 17 which is remote from the intermediate section. It has been found that the ribs 10 or 20 enhance the resistance of the section 3 or 17 as well as of the entire article to such an extent that the article can stand bending stresses, especially rotating bending stresses, without any loosening of the bond between the internal surface of the second tubular section and the adjacent surface or surfaces of the sleeve. The provision of ribs on the second tubular section involves a minimum of additional expenditures, and the article can be mass-produced in available extruding, casting and like machines.

The provision of a substantial number of preferably equidistant ribs (it has been found that the number of ribs should at least equal but preferably exceeds three) renders it possible to ensure that the article exhibits the same, or substantially the same, resistance to bending about any one of a number of different axes. Such uniform or symmetrical resistance to bending stresses has been found to be further enhanced if the reinforcing ribs are located in planes which include the common axis of the sections of the improved article.

The function of the radially outwardly extending collar 11 on the intermediate section 2 of of the article which is shown in FIG. 1 is analogous to that of the tubular component 21 which is shown in FIGS. 3 and 4. Thus, the component 21 also extends from the intermediate portion (18) but it extends in parallelism with the axis of the section 17 rather than radially of such section. It has been found that the collar 11 and the component 21 contribute significantly to stability of the respective second sections 3 and 17, even if the articles are subjected to pronounced bending stresses.

The additional collar 13 and the collar 12 at the free end of the tubular section 3 which is shown in FIGS. 1 and 2 are optional but desirable and advantageous because they even further enhance the ability of the section 3 and of the entire article of FIGS. 1 and 2 to resist bending stresses which would tend to break the bond between the sleeve 5 and the internal surface 4 of the section 3.

The improved article is susceptible of many additional modifications. For example, the reinforcing ribs 10 or 20 can be replaced by and/or used jointly with ribs having other orientations, e.g., with ribs which are parallel to the common axis of the three sections but whose planes do not include such axis. Furthermore, the improved article can serve numerous other purposes, i.e., not necessarily as a pulley whose hub confines a metallic sleeve.

The exact manner in which the sleeve 5 or 16 is embedded in the corresponding tubular section 3 or 17 forms no part of the present invention. For example, the sleeve can constitute an insert in a mold or form wherein the improved article is formed by casting, by extrusion or in accordance with any other suitable technique.

Polyurethane is one of the presently preferred polymeric material which can be used for the making of the improved article. The sleeve can be made of steel.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What I claim is:

1. An article made of cast or extruded polymeric material comprising two coaxial tubular polymeric sections extending in opposite axial directions with an integral annular intermediate polymeric section disposed between said tubular sections and a metallic sleeve positively secured in a bore of one of said tubular sections, this tubular section having an external surface with a plurality of reinforcing ribs thereon extending from the external surface at least substantially in the direction of the common axis of the two tubular sections.

2. The article of claim 1 wherein the said external surface has at least three equidistant ribs disposed in planes including the common axis of the tubular sections.

3. The article of claim 1 wherein the other of said tubular sections and the intermediate section have additional external surfaces with diameters which approximately equal the diameter of the external surface of said one tubular section, said intermediate section having a ring-shaped collar extending beyond the respective external surface and the external surface of said one tubular section having an end portion which is remote from said intermediate section, at least some of said ribs extending from said collar to the end portion of the external surface of said one tubular section.

4. The article of claim 1 wherein the other of said tubular sections has an external surface with a diameter greater than the diameter of the external surface of said one tubular section, said intermediate section extending substantially radially inwardly from said other tubular section to said one tubular section and said one tubular section having an end portion remote from said intermediate section, at least some of said ribs extending from said intermediate section to the end portion of said one tubular section.

5. The article of claim 1 wherein said one tubular section has an end portion remote from said intermediate section and ringshaped collar extending from said external surface in the region of said end portion, at least some of said ribs having end portions which are integral with said collar.

6. The article of claim 5 wherein said one tubular section has at least one additional ring-shaped collar extending from said external surface intermediate said end portion and said intermediate section, at least some of said ribs being integral with and extending axially from said one tubular section beyond both sides of said additional ring-shaped collar.

7. The article of claim 1 further comprising a tubular component integral with said intermediate section and surrounding said ribs, said tubular component being coaxial with said tubular sections and being integral with at least some of said ribs.

8. The article of claim 7 wherein the axial length of said tubular component at least approximates the axial length of said one tubular section.

9. The article of claim 1 wherein the axial length of one of said tubular sections exceeds the axial length of the other of said tubular sections.

10. The article of claim 1 wherein the other of said tubular sections is a pulley.

11. The article of claim 1 wherein said ribs are equidistant from each other, as considered in the circumferential direction of said one tubular section, and the number of said ribs exceeds ten.

* * * * *